Figure 6B:
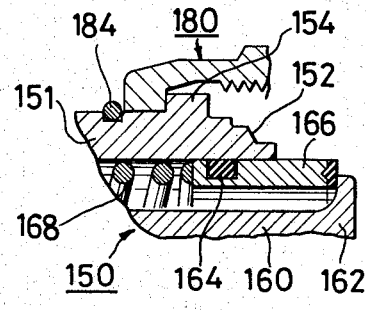

United States Patent [19]
Miyazaki et al.

[11] 3,994,317
[45] Nov. 30, 1976

[54] PIPE COUPLING

[75] Inventors: Osahiko Miyazaki; Yukio Aoki; Yutaka Tanaka, all of Tokyo, Japan

[73] Assignee: Nitto Kohki Co., Ltd., Tokyo, Japan

[22] Filed: Dec. 9, 1974

[21] Appl. No.: 530,601

[30] Foreign Application Priority Data
July 31, 1974    Japan................................ 49-86920
Nov. 15, 1974   Japan............................... 49-131167

[52] U.S. Cl. ........................................ 137/614.03
[51] Int. Cl.² ........................................ F16L 37/28
[58] Field of Search.................. 137/614.03, 614.04; 285/329, 334.4

[56] References Cited
UNITED STATES PATENTS

| | | | |
|---|---|---|---|
| 1,484,295 | 2/1924 | Bundy................................. | 285/329 |
| 2,665,928 | 1/1954 | Omon et al..................... | 137/614.04 |
| 2,821,412 | 1/1958 | Frye............................... | 137/614.03 |
| 3,117,592 | 1/1964 | Abbey et al. .................. | 137/614.03 |
| 3,205,911 | 9/1965 | Swick, Jr. ...................... | 137/614.03 |

FOREIGN PATENTS OR APPLICATIONS

| | | | |
|---|---|---|---|
| 865,201 | 1/1940 | France........................... | 137/614.03 |
| 51,249 | 12/1941 | France........................... | 137/614.03 |
| 827,785 | 5/1938 | France | |
| 1,800,856 | 5/1970 | Germany........................... | 285/329 |

*Primary Examiner*—William R. Cline
*Assistant Examiner*—H. Jay Spigel
*Attorney, Agent, or Firm*—Ostrolenk, Faber, Gerb & Soffen

[57] ABSTRACT

Pipe coupling usable for piping in pneumatic conditioning systems which has male and female assemblies each given in the form of a single united or single body and each provided with a valve assembly which can be incorporated into the associated assembly from the front side opening and set in prescribed position and posture without need for the conventionally employed swaging operations, and a valve closure body incorporated in the male assembly whose both fringes encroach upon corresponding surfaces formed on the male and female assemblies, respectively, in order to assure simplified preparation of the male and female assemblies, enhanced reliable fluid sealing effect even after a long use and release of assembly plants from the problem of chemical pollution of the environment.

14 Claims, 10 Drawing Figures

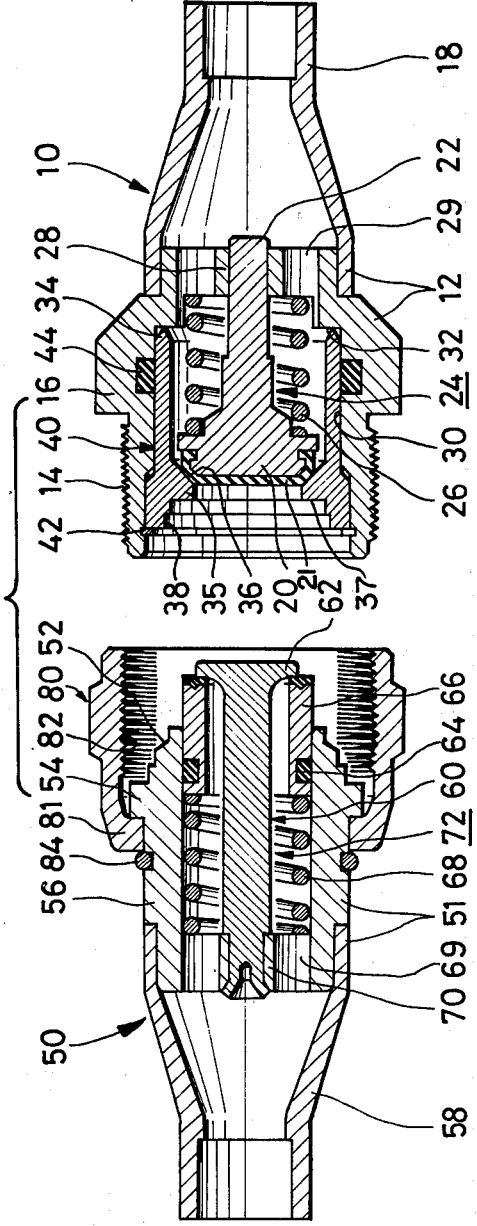
FIG.1
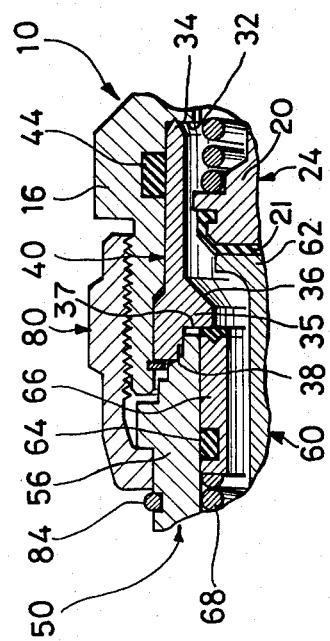
FIG.3
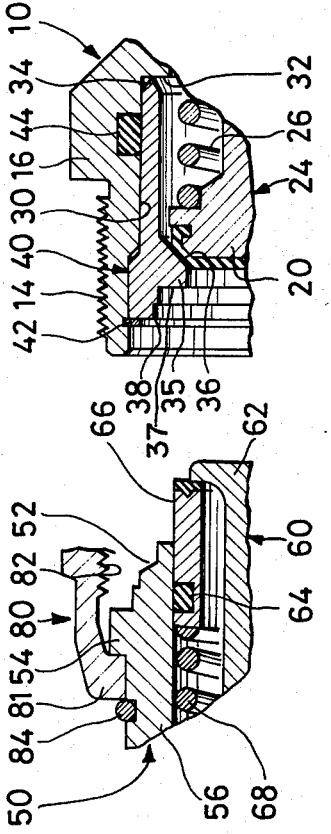
FIG.2A
FIG.2B

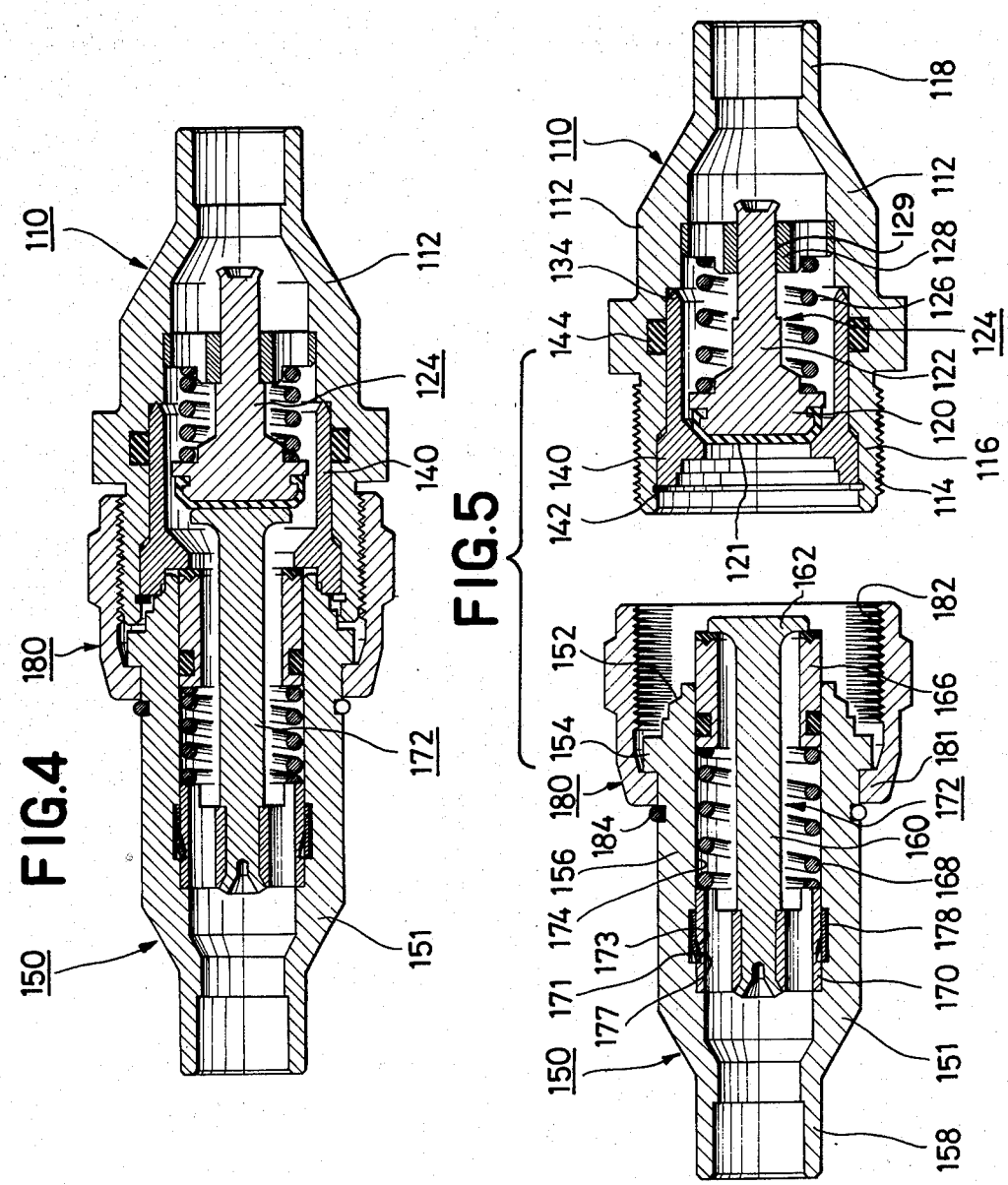

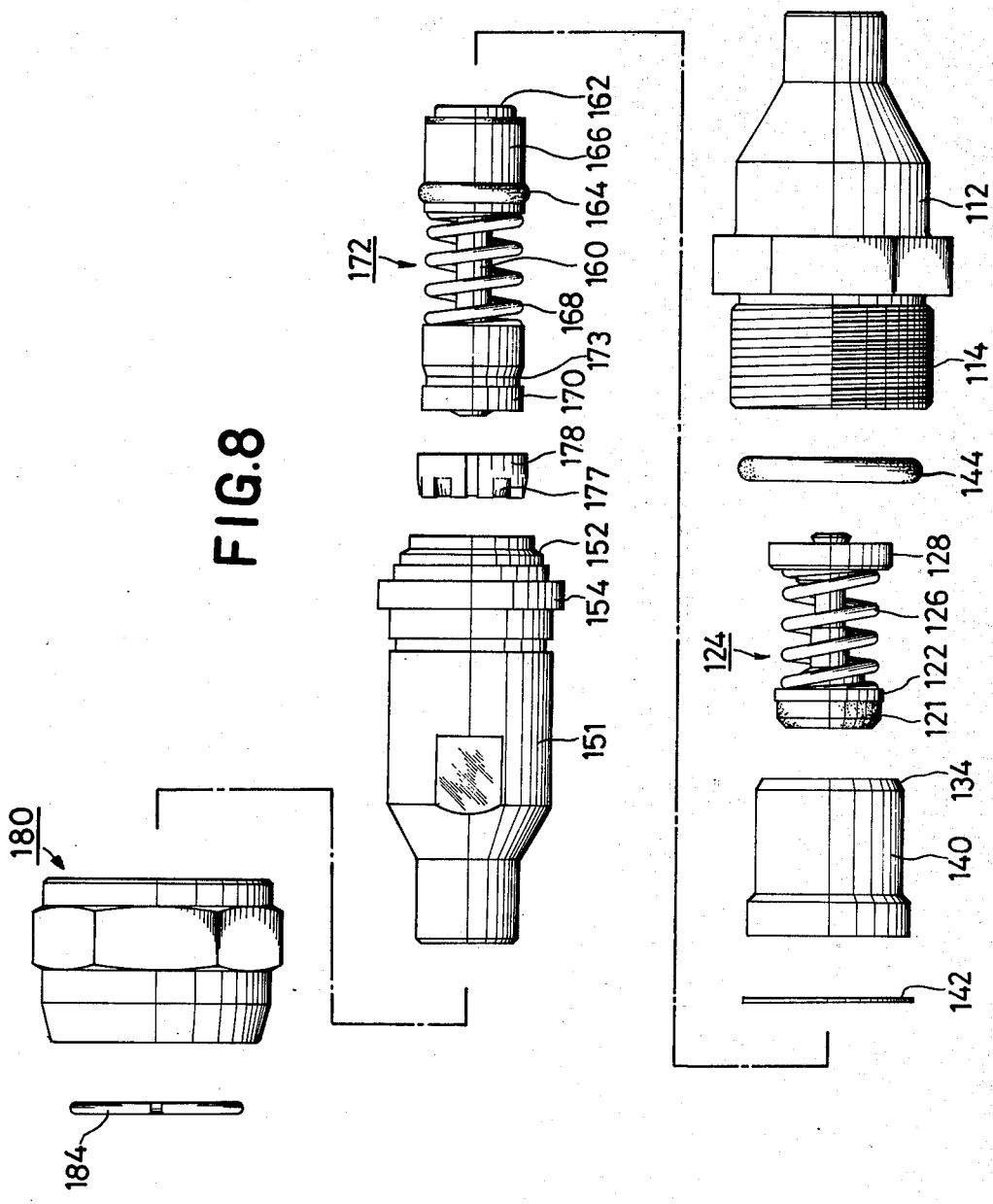

PIPE COUPLING

The present invention relates to an improved pipe coupling and, more particularly to an improved of a pipe coupling preferably usable for piping in pneumatic conditioning systems such as piping for conduction of cooling medium in a room cooling system.

In pipe coupling of the above-described type, two parts of the pipe coupling, i.e. male and female assemblies, form the ends of the pipes to be connected to each other and each is provided with an automatically acting valve which in the disconnected state of the coupling is closed and in the connected state of the coupling is open.

For such pipe couplings, simplified procedures in the connecting and disconnecting of the coupling, reliable fluid sealing function and minimization of the influence of the material cost upon the total production are outstanding requirements.

In U.S. Pat. No. 3,205,911 as an example, the pipe coupling is comprised of male and female assemblies that are each provided with an associated valve assembly and each of the male and female assemblies must be assembled separately in advance of the connection of the coupling, such assembly being done in the following complicated manner. A main tube which is adapted for connection with the other assembly is fixedly joined at its rear end to the front end of an intermediate tube and the latter is adapted for connection with a fluid conductive pipe via brazing in order to form a main tubular body of a single united construction. Next, the valve assembly is encased with the main tubular body from the open rear side of the tubular body and a suitable guide rod is inserted from the back side in order to hold the valve assembly at the prescribed position in the main tubular body. With the valve assembly being so held by the guide rod, a provisional swaging is applied to the main tubular body in order to fix the position and posture of the valve assembly within the tubular body. Next, after insertion of another guide rod into the main tubular body from the back side, a main swaging is applied to the main tubular body in order to cause a diametral contraction of the intermediate tube to the extent that the intermediate tube assumes a shape suited for connection with the given fluid conductive pipe.

This procedure for preparation of the male and female assemblies is accompanied with several fatal drawbacks. The complicated process including the double swaging operations and use of the brazing operation results in increases production cost for the pipe couplings obtained. In addition, performing the swaging operation at the final stage of the preparation tends to cause disorders in the position and posture of the valve assemblies provisionally set by the first stage light swaging. This leads to the need for employment of an additional final products inspection process and to a considerable lowering in the yield of acceptable products. Further, after the brazing operation, flux cleaning must be applied to the brazed parts of both assemblies, which may cause serious chemical pollution of the environment.

Even aside from the above-described drawbacks of the process of forming the assemblies, the conventional pipe couplings themselves have several drawbacks. The main parts of the pipe couplings are in general made of such light metal materials as brass or aluminum alloys which are very expensive and the costs of which fluctuate considerably in market. On the other hand, the diameter of the main parts of the pipe couplings is generally almost three times larger than the of the fluid conduction pipes to be coupled to the pipe couplings in order to constrain the fluid pressure loss in the coupling region. Due to this special requirement in the constructional design, the manufacturing cost of pipe couplings is apt to be greatly influenced by the material cost thereof.

Further, most conventional pipe couplings employ a fluid sealing system which is in general based on tight pressure contact or abutment of two confronting members of the pipe coupling. An example of the above is, a tight pressure abutment of a valve head of one of the assemblies confronting a valve seat provided in the other of the assemblies via a packing to form a fluid sealing system. This kind of fluid sealing system tends to be degraded especially when a fluid of the kind corrosive to the materials composing the pipe coupling is used in the piping system.

The principal object of the present invention is to provide an improved pipe coupling which can be assembled and disassembled by a very simple process.

The other object of the present invention is to provide an improved pipe coupling which can be assembled without need for brazing, its accompanying operations and the machines necessary for brazing.

A further object of the present invention is to provide an improved coupling which can be assembled without causing any pollution of the environment.

A further object of the present invention is to provide an improved pipe coupling which can assure an enhanced reliable fluid sealing effect after a long use even when fluids corrosive to the materials composing the coupling are conducted through the piping system.

A further object of the present invention is to provide an improved pipe coupling which can be manufactured with enhanced yield of the acceptable product.

In order to attain the above-described objects, the pipe coupling of the present invention comprises in combination, a male assembly having a first main tubular body defining a first bore for conduction of fluid, a female assembly having a second main tubular body defining a second bore for conduction of the fluid and which assembly is accompanied by a union nut which is detachably mounted on the front end portion of the second main tubular body and is adapted for a screw engagement at its front end with the front end portion of the first main tubular body of the male assembly for connection of the pipe coupling, a first valve assembly incorporated in the bore of the first main tubular body, a second valve assembly incorporated in the bore of the second main tubular body, means for retaining the second valve assembly in prescribed position and posture within the second main tubular body, means for establishing a communication between the bores of the main tubular bodies for conduction of fluid through the pipe coupling when connection of the latter is accomplished and means for retaining the first valve assembly in a prescribed position and posture within the first main tubular body and for establishing a metal-to-metal encroachment seal between the male and female assemblies when connection of the pipe coupling is accomplished.

In one preferred embodiment of the present invention, each of the first and second main tubular bodies is comprised of a main tube and an intermediate tube fixedly coupled at its front end to the rear end of the main tube and intended at its rear end for connection to a given fluid conduction pipe.

In another preferred embodiment of the present invention, each of the first and second main tubular bodies is in the form of a single body.

As above-described, the pipe coupling of the present invention is comprised of a pair of assemblies and, in this specification, members or parts of one assembly close to the other assembly are referred to with the expression "front" while those of one assembly remote from the other assembly are referred to with the expression "rear". Further, movements of members of one assembly towards the other assembly are referred to with the expression "forwardly" while those of one assembly away from the other assembly are referred to with the expression "rearwardly".

Figure 6A:
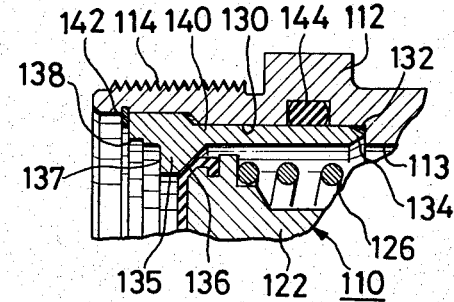
Figure 7:
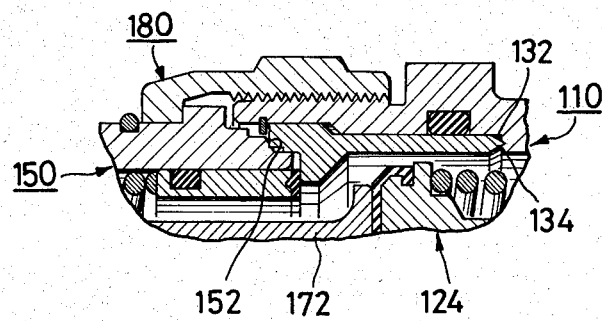

Further features and advantages of the present invention will be made clearer from the ensuing description, reference being made to the embodiment shown in the accompanying drawings, in which;

FIG. 1 is a side sectional plan view of the first embodiment of the pipe coupling of the present invention in the disconnected state, FIG. 2A is an enlarged fragmentary side sectional plan view of the male assembly of the pipe coupling shown in FIG. 1 in the disconnected state, FIG. 2B is an enlarged fragmentary side sectional plan view of the female assembly of the pipe coupling shown in FIG. 1 in the disconnected state, FIG. 3 is an enlarged fragmentary side sectional plan view of the pipe coupling shown in FIG. 1 in the connected state, FIG. 4 is a side sectional plan view of the second embodiment of the pipe coupling of the present invention in the connected state, FIG. 5 is a side sectional plan view of the pipe coupling shown in FIG. 4 in the disconnected state, FIG. 6A is an enlarged fragmentary side sectional plan view of the male assembly of the pipe coupling shown in FIG. 4 in the disconnected state, FIG. 6B is an enlarged fragmentary side sectional plan view of the female assembly of the pipe coupling shown in FIG. 4 in the disconnected state, FIG. 7 is an enlarged fragmentary side sectional plan view of the pipe coupling shown in FIG. 4 in a connected state, and FIG. 8 is a side plan view of the pipe coupling shown in FIG. 4 in the fully disassembled state.

An embodiment of the pipe coupling according to the present invention is shown in FIG. 1 in the disconnected disposition. The pipe coupling comprises, as its major elements, a male assembly 10 to be connected at its rear end to a suitable fluid conductive pipe or the like (not shown), a female assembly 50 to be connected at its rear end to a suitable fluid conducting pipe or the like and at its front end to the male assembly 10 and a union nut 80 for connecting the two assemblies 10 and 50 at their front end portions.

The male assembly 10 is comprised of a main tubular body 12 and a valve assembly 24 incorporated within the main tubular body 12 in a later described arrangement.

The main tubular body 12 is comprised of an intermediate tube 18 adapted for connection with the fluid conducting pipe or the like and a main tube 16 fixed at its rear end to the front end of the intermediate tube 18 by, for example, brazing. The front part of the main tube 16 is provided with an outer thread 14 for a screw engagement with the union nut 80. The main tube 16 is further provided at its rear end portion with a center bearing 28 formed internally in one body therewith and having a center bore for the valve assembly 24.

The valve assembly 24 is placed within a bore of the main tube 16 and includes a valve body 22 whose rear extension is slidably received within the center bore of the center bearing 28. The diametrally enlarged front end portion of the valve body 22 forms a valve head 20 and the front face of the head 20 is covered with a packing layer 21. A compression coil spring 26 is placed surrounding the rear extension of the valve body 22 while bearing at one end against the rear surface of the valve head 20 and at the other end against the front surface of the center bearing 28.

This valve assembly 24 is assembled together in advance of insertion into the bore of the main tube 16 and the valve body 22 is loaded forwardly by the spring 26 when placed in position.

In the area of the main tube 16 near the front opening, a valve closure body 40 of a tubular construction is inserted within the bore. As shown in detail in FIG. 2A, this valve closure body 40 has a sharply edged rear fringe 34 confronting a step 32 formed on the inner wall 30 defining the bore, a valve seat 36 of a forwardly converging conical construction formed on the rear surface of an inner flange 35 on the inner wall 30 and adapted for a snug contact with the packing layer 21 of the valve head 20, an engaging surface 37 formed on the front side of the inner flange 35 and adapted for a contact with the later described sliding valve 66 of the female assembly 50 and a front fringe 38 formed forwardly of the inner flange 35. A stopper ring 42 is provided in front of the front fringe 38 of the valve closure body 40 in order to retain the latter in position. An elastic seal ring 44 is accommodated within an annular groove formed in the inner wall 30 of the main tube 16 in a resilient pressure contact with the outer periphery of the valve closure body 40 for a sealing purpose.

Again in FIG. 1, the female assembly 50 comprises a main tubular body 51 which is made up of an intermediate tube 58 adapted for connection with the suitable fluid conducting pipe or the like and a main tube 56 fixed at its rear end to the front end of the intermediate tube 58 by, for example, brazing and provided near its front end with an outer flange 54 adapted for engagement with the union nut 80. At a position somewhat rearwardly of the outer flange 54, an annular groove is formed in the outer periphery of the main tube 56 in order to receive a stopper ring 84 for holding the union nut 80 in position in cooperation with the outer flange 54. The main tube 56 is further provided at its front fringe with a forwardly converging conical surface 52 suited for a snug abutment against the front fringe 38 of the above-described valve closure body 40 of the male assembly 10. (see FIG. 2B)

The main tube 56 is further provided at its rear end portion with a center bearing 70 formed internally in one body therewith and having a center bore for the valve assembly 72.

The valve assembly 72 comprises an axially elongated valve body 60 which is held at its rear end by the center bearing 70 in an axially immovable disposition and its diametrally enlarged front valve head 62 is exposed out of the main tube 56. A sliding valve 66 of a tubular construction is inserted into the main tube 56 and a compression coil spring 68 is disposed on the rear side of the sliding valve 66 surrounding the stem of the valve body 60 with its one end bearing against the rear fringe of the sliding valve 66 and its the other end against the front surface of the center bearing 70. The sliding valve 66 is so designed that its inner diameter is smaller than the maximum outer diameter of the valve head 62 of the valve body 60. Hence, the sliding valve 66 is always spring loaded forwardly into a resilient pressure contact with the rear surface of the valve head 62 of the valve body 60 through the intermediary of a suitable packing. An elastic seal ring 64 is provided in the outer periphery of the sliding valve 66 in order to seal the sliding contact of the valve 66 with the front part of the main tube 56. (see FIG. 2B)

The union nut 80 is provided at its female assembly side with an end inner flange 81 suited for an axially immovable engagement with the female assembly 50 and, as already described, the outer flange 54 and the stopper ring 84 coact for this engagement. The union nut 80 is further provided with an inner thread 82 for a screw engagement with the outer thread 14 of the main tube 16 of the male assembly 10.

Before connection of the pipe coupling of the present invention, both assemblies 10 and 50 are separately assembled into the constructions shown in FIG. 2A and FIG. 2B respectively.

In assembling the male assembly 10, the valve body 22 accompanied by the coil spring 26 is inserted into the main tube 16 which is already fixed at its rear end to the intermediate tube 18 by brazing, the valve closure body 40 is inserted into the main tube 16 compressing the spring 26 via the valve body 22 and, finally, the stopper ring 42 is set in order to hold the valve assembly 24 in position within the main tubular body 12. All the above-described insertions of the components are carried out from the open front side of the male assembly 10.

In this registered disposition of the male assembly 10, the valve body 22 is urged forwardly by the coil spring 26 in order to cause a resilient pressure contact of the valve head packing layer 21 with the valve seat 36 of the valve closure body 40. Due to this pressure contact, the valve system of the male assembly 10 is kept in a closed state and leakage of the fluid in the bore of the main tubular body 12 is prevented.

In assembling the female assembly 50, the union nut 80 is inserted over the main tubular body 51 from the rear side and the nut is fixedly mounted thereto via the clamp action to be caused by the outer flange 54 of the main tube 56 and the stopper ring 84. After insertion of the sliding valve 66 accompanied with the spring 68, the valve body 60 is fixedly mounted within the bore of the main tube 56 via the center bearing 70. As an alternative, setting of the valve assembly 72 may anticipate the mounting of the union nut 80 to the main tube 56.

In this assembled state, the sliding valve 66 is urged forwardly by the coil spring 68 into a resilient pressure contact with the valve head 62. By this pressure contact, the valve mechanism of the female assembly 50 is kept closed in order to prevent leakage of the fluid in the bore of the main tubular body 51.

The union nut 80 is combined with the female assembly 50 through the intermediary of the outer flange 54 and the stopper ring 84 of the main tubular body 51.

Next, for connection of the pipe coupling of the present invention, the union nut 80 is screwed over the outwardly threaded front part 14 of the main tube 16 of the male assembly 10. When the union nut 80 is completely screwed over the outer thread 14 of the main tube 16, the pipe coupling assembly of the present invention assumes the disposition shown in FIG. 3, in which the valve head 20 of the male assembly 10 comes into abutment with the valve head 62 of the female assembly 50 via the packing layer 21. As the valve body 60 is kept in the axially immovable state by the fixed bearing 70, the valve body 22 of the male assembly 10 is pushed rearwardly away from the valve seat 36. Concurrently with this, the front fringe of the sliding valve 66 abuts the engaging surface 37 of the valve closure body 40 in order that the same is pushed rearwardly away from the valve head 62.

Thanks to the rearward movements of the valve body 22 and the sliding valve 66, a communication is established between the bores of both assemblies 10 and 50 so that the fluid may flow from the male side to the female side and vice versa.

In the above-described connected disposition of the pipe coupling of the present invention, the front fringe 38 of the male side valve closure body 40 encroaches upon the conical surface 52 of the female side main tube 56 while the sharply edged rear fringe 34 of the valve closure body 40 encroaches upon the step 32 of the male side main tube 56 so that the metal sealing of the connection of the two assemblies 10 and 50 is remarkably strengthened.

For the purpose of this metal sealing through the encroachment, the valve closure body 40 should preferably be made of a metallic material whose hardness is higher than those of the metallic material or materials used for the main tubular bodies 12 and 51. It is further preferred that these main tubular bodies should be made of such a light metal as brass or aluminum alloys. In this connection, however, only the main tubes 16 and 56 of the both main tubular bodies 12 and 51 are required to be made of such light metals, which are in general very expensive and, in addition, whose costs fluctuate considerably in market. Therefore, by limiting the use of such metals to the main tube parts only, the influence of the material cost upon the total production cost of the pipe coupling of the present invention could be minimized remarkably.

While the above-explained embodiment of the pipe coupling of the present invention thus assures remarkably simplified assembly of the male and female assemblies and a greatly enhanced sealing effect of the coupling, it still requires brazing the joint between the main tube and the intermediate tube, both forming the main tubular body in the joined state.

The other embodiment of the pipe coupling according to the present invention is shown in FIGS. 4 through 8. In the case of this embodiment, the main tubular bodies are given in the form of single bodies each of which is comprised of a front part corresponding to the main tube used in the foregoing embodiment and a rear part corresponding to the intermediate tube used in the foregoing embodiment, respectively.

The pipe coupling shown in FIG. 4 in the connected disposition comprises, as its major elements, a male assembly 110 to be connected at its rear end to a suitable fluid conductive pipe or the like (not shown), a female assembly 150 to be connected at its rear end to a suitable fluid conducting pipe or the like and at its front end to the male assembly 110 and a union nut 180 for connecting the two assemblies 110 and 150 at their front end portions.

The pipe coupling of the above-described construction is further illustrated in FIG. 5 in the disassembled disposition, in which the male assembly 110 is comprised of a main tubular body 112 and a valve assembly 124 incorporated within the main tubular body 112 in a later described arrangement.

The main tubular body 112 has a rear part 118 adapted for connection with the fluid conducting pipe or the like and a front part 116 extended forwardly and integrally of the rear part 118. The front part 116 of the main tubular body 112 is provided with an outer thread 114 for a screw engagement with the union nut 180.

The valve assembly 124 is placed within a bore of the main tubular body 112 and comprises a supporter piece 128 fixed within the bore in an axially immovable arrangement and having a center bore 129 and a valve body 122 whose rear extension is slidably received within the center bore of the supporter piece 128. The diametrally enlarged front end portion of the valve body 122 forms a valve head 120 and the front face of the head 120 is covered with a packing layer 121. A compression coil spring 126 is placed surrounding the rear extension of the valve body 122 while bearing at one end against the rear surface of the valve head 120 and at the other end against the front surface of the supporter piece 128.

This valve assembly 124 is assembled together in advance to be inserted into the bore of the main tubular body 112 and the valve body 122 is loaded forwardly by the spring 126 when placed in position.

In the area of the main tubular body 112 near the front opening, a valve closure body 140 of a tubular construction is inserted within the bore. As shown in detail in FIG. 6A, this valve closure body 140 has a sharply edged rear fringe 134 confronting a step 132 formed on the inner wall 130 defining the bore, a valve seat 136 of a forwardly converging conical construction formed on the rear surface of an inner flange 135 on the inner wall 130 and adapted for a snug contact with the packing layer 121 of the valve head 120, an engaging surface 137 formed on the front side of the inner flange 135 and adapted for a contact with the later described sliding valve 166 of the female assembly 150 and a front fringe 138 formed forwardly of the inner flange 135. A stopper ring 142 is provided in front of the front fringe 138 of the valve closure body 140 in order to retain the latter in position. An elastic seal ring 144 is accommodated within an annular groove formed in the inner wall 130 of the main tubular body 112 in a resilient pressure contact with the outer periphery of the valve closure body 140 for a sealing purpose.

Again in FIG. 5, the female assembly 150 comprises a main tubular body 151 which is made up of a rear part 158 adapted for connection with the suitable fluid conducting pipe or the like and a front part 156 formed forwardly and integrally of the rear part 158 and provided near its front end with an outer flange 154 adapted for engagement with the union nut 180. At a position somewhat rearwardly of the outer flange 154, an annular groove is formed in the outer periphery of the front part 155 in order to receive a stopper ring 184 for holding the union nut 180 in position in cooperation with the outer flange 154. The front part 156 is further provided at its front fringe with a forwardly converging conical surface 152 suited for a snug abutment against the front fringe 138 of the above-described valve closure body 140 of the male assembly 110. (see FIG. 6B)

A valve assembly 172 is disposed within a bore 153 of the main tubular body 151 in the later described arrangement. At a position relatively near the rear end of the main tubular body 151, an annular groove 171 is formed in the inner wall 174 defining the bore 153 in order to accommodate a metal stopper ring 178 having a rearward stopper tongue 177. Corresponding to this stopper mechanism, a supporter piece 170 inserted within the bore is provided with an annular groove 173 formed in its outer periphery for engagement with the stopper tongue 177 of the metal stopper ring 178. Owing to this engagement, the supporter piece 170 is pressed against a step formed on the inner wall 174 of the main tubular body 151 so that the supporter piece 170 is immovable in the axial direction.

A valve body 160 is held at its rear end by the supporter piece 170 in an axially immovable disposition and its diametrally enlarged front valve head 162 is exposed out of the main tubular body 151. The sliding valve 166 of a tubular construction is inserted into the front part 156 of the main tubular body 151 and a compression coil spring 168 is disposed on the rear side of the sliding valve 166 surrounding the stem of the valve body 160 with its one end bearing against the rear fringe of the sliding valve 166 and its the other end against the front fringe of the supporter piece 170. The sliding valve 166 is so designed that its inner diameter is smaller than the maximum outer diameter of the valve head 162 of the valve body 160. Hence, the sliding valve 166 is always spring loaded forwardly into a resilient pressure contact with the rear surface of the valve head 162 of the valve body 160 through the intermediary of a suitable packing on valve 166. An elastic seal ring 164 is provided in the outer periphery of the sliding valve 166 in order to seal the sliding contact of the valve 166 with the front part 156 of the main tubular body 151. (see FIG. 6B)

The union nut 180 is provided at its female assembly side with an end inner flange 181 suited for an axially immovable engagement with the female assembly 150 and, as already described, the outer flange 154 and the stopper ring 184 coact for this engagement. The union nut 180 is further provided with an inner thread 182 for a screw engagement with the outer thread 114 of the main tubular body 112 of the male assembly 110.

In the disposition shown in FIG. 8, all the elements composing the pipe coupling of the present invention are fully disassembled from each other.

Before connection of the pipe coupling of the present invention, both assemblies 110 and 150 are separately assembled into the constructions shown in FIG. 5, respectively, substantially in a manner similar to that employed in the case of the first embodiment shown in FIGS. 1 through 3. That is, the male assembly 110 assumes the disposition shown in FIG. 5, in which the valve body 122 is urged forwardly by the coil spring into a resilient pressure contact of the valve head packing layer 121 with the valve seat 136 of the valve closure body 140. Due to this pressure contact, the valve mechanism of the male assembly 110 is kept in a closed state and leakage of the fluid in the bore of the main tubular body 112 is prevented.

The female assembly 150 assumes the disposition shown in FIG. 5 also, in which the sliding valve 166 is urged forwardly by the coil spring 168 into a resilient pressure contact with the valve head 162. By this pressure contact, the valve mechanism of the female assembly 150 is kept closed in order to prevent leakage of the fluid in the bore of the main tubular body 151.

The union nut 180 is combined with the female assembly 150 through the intermediary of the outer flange 154 and the stopper ring 184 of the main tubular body 151.

Next, for connection of the pipe coupling of the present invention, the union nut 180 is screwed over the outwardly threaded front part 116 of the main tubular body 112 of the male assembly 110. When the union nut 180 is completely screwed over the outer thread 114 of the main tubular body 112, the pipe coupling assembly of the present invention assumes the disposition shown in FIGS. 4 and 7, in which the valve head 120 of the male assembly 110 comes into abutment with the valve head 162 of the female assembly 150 via the packing layer 121. As the valve body 160 is kept in the axially immovable state by the fixed supporter piece 170, the valve body 122 of the male assembly 110 is pushed rearwardly away from the valve seat 136. Concurrently with this, the front fringe of the sliding valve 166 abuts the engaging surface 137 of the valve closure body 140 in order that the same is pushed rearwardly away from the valve head 162.

Thanks to the rearward movements of the valve body 122 and the sliding valve 166, a communication is established between the bores of both assemblies 110 and 150 so that the fluid may flow from the male side to the female side and vice versa.

In the above-described connected disposition of the pipe coupling of the present invention, the front fringe 138 of the male side valve closure body 140 encroaches upon the conical surface 152 of the female side main tubular body 151 while the sharply edged rear fringe 134 of the valve closure body 140 encroaches upon the step 132 of the male side main tubular body 112 so that the metal sealing of the connection of the two assemblies 110 and 150 is remarkably enstrengthened.

In the case of this embodiment, the brazing needed for coupling of the main tubular bodies in the first embodiment can be omitted as the main tubular bodies of this embodiment are given in the form of single bodies each of which is composed of the front part corresponding to the main tube and the rear part corresponding to the intermediate tube used in the foregoing embodiment.

The following meritorious effects will be resulted through employment of the present invention:

1. As the main tubular body of the first embodiment of the pipe coupling of the present invention is given in the form of a single united body composed of the main tube and the intermediate tube, swaging can be applied to the intermediate separately in advance of the preparation of the male and female assemblies. In other words, it is no longer necessary to apply the main swaging to the assemblies at the final stage of the preparation of the assemblies. Thus undesirable disorders in the position and posture of the valve assembly to be caused by the final stage swaging in the conventional art can be obviated successfully and this leads to a high yield of the acceptable products.

2. As the main tubular body of the first embodiment of the pipe coupling of the present invention is composed of the two elements, i.e. the main tube and the intermediate tube and only the main tube, which is shorter than the large diameter main part of the pipe coupling of the conventional type, is required to be made of such expensive light metallic materials as brass or aluminum alloys, the undesirable influence of the material cost on the total manufacturing cost can be minimized.

3. As the valve assembly can be inserted into the main tubular body from the front side opening and the position and posture of the valve assembly can be fixed by use of the stopper ring according to the present invention, it is no longer necessary to apply the provisional swaging to the assembly. This simplifies the preparation of the assemblies very much.

4. As the fixing of the position and posture of the valve assemblies in their assocated assemblies can be accomplished without need for swaging, coupling of the intermediate tubes to the main tubes, i.e. preparation of the main tubular bodies, could be practiced at any factory separate from the assembly plant of the pipe coupling in the case of the first embodiment. The flux cleaning process accompanying the coupling of the main and intermediate tubes by brazing could also be practiced at any factory separate from the assembly plant. Thus, if so required, the assembly plant could be quite free from any trouble such as chemical pollution of the environment to be caused by practice of such flux cleaning process after the brazing.

5. In the case of the second embodiment of the pipe coupling of the present invention, even the brazing process needed with the first embodiment can be omitted because the main tubular bodies of the second embodiment are given in the form of a single body. This assures a more simplified procedure in the preparation of the assemblies and freedom from the problem of pollution of the environment.

6. Reduction in the number of operations necessary for preparation of the assemblies results in a corresponding reduction in the need for fluid leakage tests. For example, the pipe coupling of the second embodiment needs no leakage test to be, whereas this is required after the brazing operation in the pipe coupling of the first embodiment.

7. Thanks to the employment of the metal-to-metal encroachment sealing system, accidental leakage of the fluid flowing through the pipe coupling can be almost perfectly prevented. In addition, as such an encroachment can be cancelled by assistance of the spring load when the union nut is released, the valve closure body could easily be replaced when its sealing function lowers due to accidental breakage or deformation of the sealed fringe portions. This ease of the replacement of the valve closure body is very advantageous in the final leakage test of the pipe coupling because it is no longer necessary to discard an entire male assembly as an unacceptable product due to the defect or defects in the quality of the metal sealing ring, i.e. the valve closure body.

What is claimed is:

1. A pipe coupling with means for ensuring a fluid-tight seal, said coupling comprising:
    a female assembly and a male assembly;
    said male assembly comprising a first main tubular body having first internal walls shaped to define a first bore for conduction of fluid; said first tubular body having a front portion which faces toward said female assembly when said male and said female assemblies are united; said first tubular body front portion including first union means which are adapted to cooperate with union means on said female assembly;
    a first valve assembly incorporated in said first bore; said first valve assembly comprising:

an annular, ring shaped, valve closure body, which is positioned in and is in fluid-tight sealed engagement with said first walls and which has an end facing toward said female assembly when said male and said female assemblies are united and an end facing away from said female assembly; said valve closure body having a front fringe located at said end thereof facing toward said female assembly; said front fringe having a first portion for engaging a tubular body of said female assembly and a second portion, radially inward of its first portion, for engaging a second valve body of said female assembly;

said valve closure body having a rear fringe at said end thereof facing away from said female assembly; said annular valve closure body having an annular interior; a first valve seat defined on said interior of said valve closure body;

a step formed in said first internal walls including a step surface facing toward said first tubular body front portion; said step surface being positioned for and adapted for encroachment thereupon by said rear fringe and being sealingly engageable with said rear fringe;

said first valve assembly further comprising a first valve body in said first bore; first means for supporting said first valve body for enabling axial movement thereof through said first tubular body; said first valve seat facing away from said first tubular body front portion and facing toward and being shaped to be sealingly engaged by said first valve body; first biasing means for normally urging said first valve body into fluid-tight contact against said first valve seat for preventing leakage thereby, thereby to normally seal closed said first tubular body;

abutment means in said first tubular body for being engaged by and for retaining said valve closure body against movement under the bias of said first biasing means;

said female assembly comprising a respective second main tubular body having second internal walls shaped to define a second bore for conduction of fluid; said second tubular body having a front portion which faces toward said male assembly when said male and said female assemblies are united; a second union means at said second tubular body front portion for being engaged with said first union means on said first tubular body front portion, thereby to secure said first and second tubular bodies together;

said second tubular body having a first surface at its said front portion that is facing toward and that is sized, shaped, and positioned so as to be encroached upon and sealingly engaged by said first portion of said front fringe of said valve closure body upon said first and second union means engaging;

a second valve body sealingly carried in said second tubular body and in fluid sealing engagement with and movable along said second walls of said second bore;

a second valve seat located in said second tubular body for engagement with said second valve body; said second valve seat body having a valve seat surface that faces away from said front portion of said second tubular body; said second valve body being located further from said front portion of said second tubular body than said seat valve surface; second biasing means for normally urging said second valve body into fluid tight contact against said second valve seat surface for preventing leakage thereby, thereby to normally seal closed said second tubular body;

said second portion of said front fringe of said valve closure body being so shaped and positioned and said second valve body being so shaped and having a surface that faces toward said male assembly when said male and said female assemblies are united and said second valve body surface being so positioned that upon said first and second union means engaging, said front fringe second portion sealingly engages against the cooperating said second valve body surface and said front fringe moves said second valve body off said second valve seat surface against the bias of said second biasing means;

valve shifting means in said second tubular body shaped and positioned for engaging and lifting said first valve body in said first tubular body off said first valve seat against the bias of said first biasing means upon said first and said second union means engaging.

2. The coupling of claim 1, further comprising a bearing secured in said first tubular body for supporting said first valve body and through which said first valve body passes in a manner permitting axial movement of said first valve body through said first tubular body.

3. The coupling of claim 1, wherein said first union means comprises a threaded surface on the exterior of said first tubular body and said second union means comprises an internally threaded union nut shaped to be screwed onto said first union means and secured to said second tubular body for drawing same toward said first tubular body upon tightening of said union nut.

4. The coupling of claim 1, wherein said rear fringe is shaped to a sharpened edge, thereby to enable said rear fringe to securely encroach upon said step; said front fringe portion that engages said second tubular body first surface being a sharpened corner and said second tubular body first surface being tapered conically to be securely encroached upon by said front fringe.

5. Improved pipe coupling as claimed in claim 1 in which said valve closure body is made of a metallic material whose hardness is higher than the hardnesses of the materials of which said step and said first surface are comprised.

6. Improved pipe coupling as claimed in claim 1 in which each of said first and second main tubular bodies is in the form of a single body.

7. The coupling of claim 1, wherein said second valve seat is on a valve seat body that is secured in said second tubular body to be movable therewith; said valve seat body projects toward said first tubular body a sufficient distance such that said valve seat body comprises said valve shifting means of said second tubular body; said valve seat body projects sufficiently toward said first tubular body as to engage said first valve body before completion of the engagement of said first and said second union means.

8. The coupling of claim 7, wherein said second valve seat body is elongated and extends axially of said second tubular body and has a front surface projecting forwardly of said second valve seat surface with respect to said second tubular body, said front surface of said second valve seat body being the part thereof that engages said first valve body and lifts said first valve body off said first valve seat.

9. The coupling of claim 8, further comprising a support in said second tubular body and located rearwardly of said second valve element with respect to said second tubular body for rigidly supporting said second valve seat body in said second tubular body.

10. The coupling of claim 8, wherein said second valve element is annular and passes around said second valve seat body.

11. Improved pipe coupling as claimed in claim 1 in which each of said first and second tubular bodies is comprised of a main tube having a front end facing toward the front end of the other of said tubular bodies and also having an opposite rear end, and each is further comprised of an intermediate tube having a front end which is fixedly coupled to said rear end of the respective said main tube and said intermediate tube having a rear end for connection with a fluid conduction pipe.

12. Improved pipe coupling as claimed in claim 11 in which said main tubes of said tubular bodies are made of light metallic materials.

13. Improved pipe coupling as claimed in claim 12 in which said main tubes of said tubular bodies are made of brass.

14. Improved pipe coupling as claimed in claim 12 in which said main tubes of said tubular bodies are made of aluminum alloys.

* * * * *